W. HOBSON.
CAR TRUCK.
APPLICATION FILED APR. 22, 1911.
1,023,019.
Patented Apr. 9, 1912.
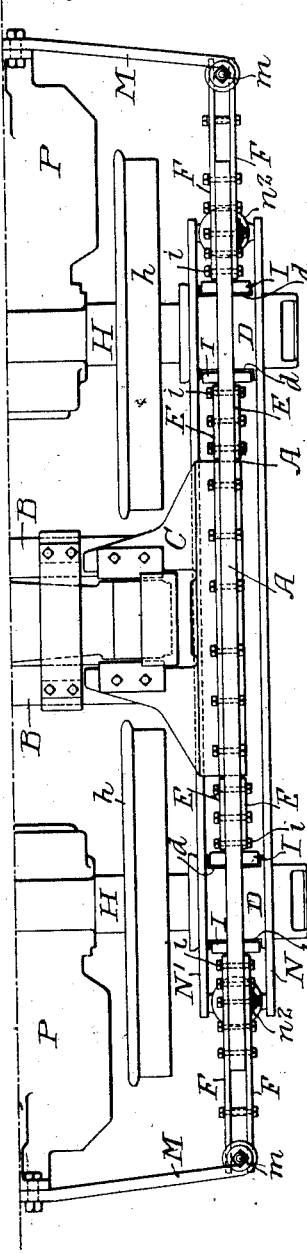
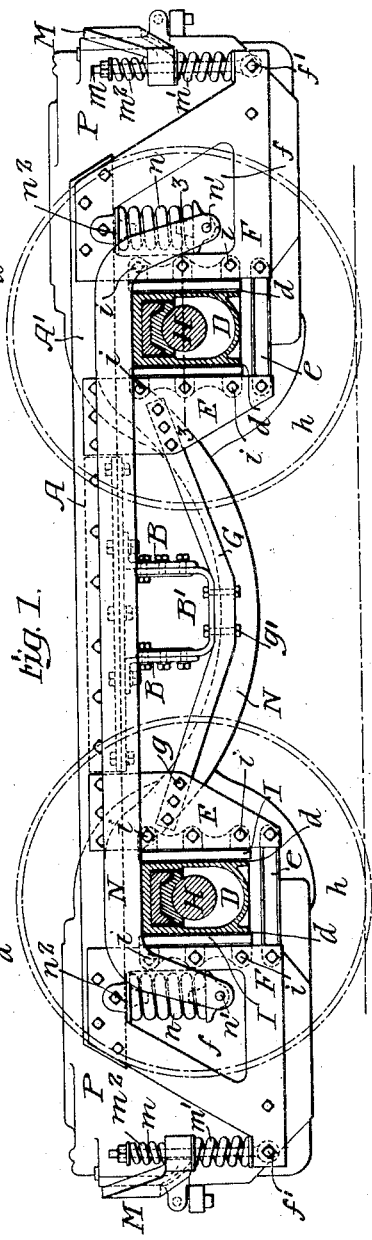
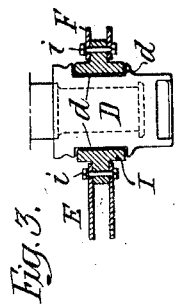
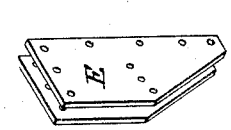
Witnesses—
Inventor:—
Walter Hobson.
by his Attorneys,

UNITED STATES PATENT OFFICE.

WALTER HOBSON, OF PHILADELPHIA, PENNSYLVANIA, ASSIGNOR, BY MESNE ASSIGNMENTS, TO THE BALDWIN LOCOMOTIVE WORKS, OF PHILADELPHIA, PENNSYLVANIA, A CORPORATION OF PENNSYLVANIA.

CAR-TRUCK.

1,023,019.      Specification of Letters Patent.      Patented Apr. 9, 1912.

Application filed April 22, 1911. Serial No. 622,681.

*To all whom it may concern:*

Be it known that I, WALTER HOBSON, a citizen of the United States, residing in Philadelphia, Pennsylvania, have invented certain Improvements in Car-Trucks, of which the following is a specification.

This invention relates to certain improvements in the construction of car trucks, especially those used under trolley and interurban cars.

One object of the invention is to make a comparatively light truck, which will have the strength desired.

A further object of the invention is to construct the truck in such a manner that the pedestals can be made of plates and to provide detachable gibs for the boxes, which can be readily removed when desired.

A still further object of the invention is to provide an angle brace, which is attached to the inner pedestals and which extends under the main frame of the truck.

In the accompanying drawings:—Figure 1, is a side view, illustrating my improved truck with the boxes in section; Fig. 2, is a plan view of one-half of the truck; Fig. 3, is a sectional plan view on the line 3—3, Fig. 1; Fig. 4, is a detached perspective view, showing two of the inner pedestal plates; and Fig. 5, is a perspective view of one of the gibs.

A is one of the side frames connected to the opposite frame by transom members B; having U-shaped connections B' at each end. The side frames are connected to the transoms by plates C, made in a single piece in the present instance, and extended laterally so as to make a firm connection between the transoms and the side frames of the truck. The side frames consist of a solid bar A' extending over the boxes D and secured to each side of this bar are the depending pedestal plates E—E and F—F. The plates E are wide at the point where they are secured to the bar A' and are preferably tapered at the lower end, as clearly shown in Fig. 4.

G is an angle brace, which passes under the U-shaped portion B' of the frame. The ends of this brace extend between the plates E—E and are rigidly secured thereto by bolts $g$ and to the U-shaped frame B' by bolts $g'$; making a very rigid construction, yet allowing considerable clearance between the two inner pedestals. As each pair of plates E and F is spaced apart, due to being bolted on each side of the solid top bar A', I mount detachable gibs I between each pair of pedestal plates, as clearly shown in Figs. 1 and 3, and secure them in place by transverse bolts $i$. These gibs are preferably extended beyond the width of the side members of the truck so as to fit within the grooves $d$ in the boxes D, thus holding the boxes in the proper position. These gibs, in the present instance, are of the shape clearly illustrated in Fig. 5. Mounted in the boxes D are the axles H, on which are flanged wheels $h$. When it is desired to renew these gibs, all that is necessary is to remove the bolts $i$ and to drop the connecting bar $e$, which couples the pedestals E and F, after which the gibs can be readily detached and others substituted.

The outer pedestals are made triangular in shape and have open centers $f$. Mounted in these open centers are the springs $n$, which are located between the side frames and the equalizing beams N—N', which extend over the boxes D. Carried by the ends of these equalizing beams are spring seats $n'$ and secured to the under side of the bar A' are spring seats $n^2$. The equalizing beam N on the outside of the frame extends straight across from one box to the other, but the rear beam N' is curved and extends under the transoms, as clearly illustrated in Fig. 1.

The triangular pedestals F carry, at their outer ends, the motor supporting frame M. The ends of the supporting frame M are perforated and extending through the perforations are rods $m$, which are coupled at $f'$ to the outer ends of the triangular pedestals F. Mounted between the pedestals and the lower side of the supporting frame M is a heavy spring $m'$ and mounted between the nut on the outer end of the rod $m$ and the frame M is a light spring $m^2$.

P are the motors, which are mounted on the axles and the outer ends of these motors are supported by the frame M.

It will be seen by the above construction that I am enabled to make a very light and substantial truck, especially adapted for trolley and inter-urban work and in which the gibs or chafing blocks can be readily renewed when desired. The side frames are comparatively light and are quickly and economically manufactured. By connecting the braces to the inner pedestals in the manner shown, a comparatively short brace is used, which will be sufficiently above the road bed to give clearance.

I claim:

1. The combination in a car truck, of side frames; transoms connecting the side frames; axle boxes; each side frame being made of a top bar extending across the axle boxes; with four sets of plates secured to the top bar; two sets of plates forming the inner pedestals for the axle boxes; the other two sets of plates forming the outer pedestals; with gibs mounted between the plates of each pair and forming the guides for the axle boxes.

2. The combination in a truck of side frames and connecting transoms; each side frame being made of a solid longitudinal top bar; depending plates mounted on each side of each side bar and forming the pedestals of the truck; boxes mounted in the pedestals; gibs secured between the plates of each set and having projecting portions entering the grooves in the boxes; with bolts by which the gibs are detachably connected to the plates.

3. The combination in a car truck, of side frames and connecting transoms; axle boxes, each side frame consisting of a solid, longitudinal bar extending above the boxes; plates secured to each side of the bar and forming the pedestals; the inner pedestals being wider at the upper end; with angle braces extending under the transoms at the center of the frame and extending between the plates forming the pedestals and secured thereto at a point below the longitudinal bar.

4. The combination in a car truck, of two side frames; transoms connecting the frames; each frame having a longitudinal upper bar; with depending plates secured to each side of the bar and forming the pedestals; axle boxes mounted between the pedestals; gibs located between the plates and secured thereto and forming the guides for the axle boxes; each outer pedestal plate having an open center; springs mounted under the top bar and within the open centers of the side plates; with equalizing bars extending over the boxes and supporting the springs.

In testimony whereof, I have signed my name to this specification, in the presence of two subscribing witnesses.

WALTER HOBSON.

Witnesses:
B. R. VAN KIRK,
J. H. KERST.